United States Patent [19]
Norton et al.

[11] Patent Number: 5,386,728
[45] Date of Patent: Feb. 7, 1995

[54] VIBRATOR FOR SUBJECTING AN OBJECT TO VIBRATION

[75] Inventors: Peter Norton, Southfield, Mich.; David S. Breed, Boonton Township, Morris County, N.J.

[73] Assignee: Automotive Technologies International, Inc., Denville, N.J.

[21] Appl. No.: 840,762

[22] Filed: Feb. 24, 1992

[51] Int. Cl.⁶ ............................................. G01M 7/04
[52] U.S. Cl. .................................................. 73/668
[58] Field of Search .................. 73/662, 663, 667, 668

[56] References Cited

U.S. PATENT DOCUMENTS 3,163,786  12/1964  Dickinson ........................... 73/668
4,858,488  8/1989  Butts ................................... 73/668

FOREIGN PATENT DOCUMENTS 0057576  5/1977  Japan .................................... 73/668

OTHER PUBLICATIONS

"Rotary Crash Sensor Tester" by D. S. Breed, V. Castelli, and W. T. Sanders; Automotive Engineering, vol. 99 No. 4 (Apr. 1991) pp. 25–28.

"A New Automobile Crash Sensor Tester" by D. S. Breed, V. Castelli, and W. T. Sanders; S.A.E. paper No. 910655 (Feb. 25, 1991–Mar. 1, 1991) pp. 1–19.

Primary Examiner—Hezron E. Williams
Assistant Examiner—Rose M. Finley
Attorney, Agent, or Firm—Brian Roffe

[57] ABSTRACT

Apparatus is disclosed for subjecting a test object to a vibration test. A preferred embodiment of the apparatus uses a flat coil assembly with an arrangement of permanent magnets. The vibrator is small and light weight. Hinge structures are disclosed which permit the vibrator to be used in conjunction with a shock testing machine or with other vibrators. This vibrator design is easily adapted for use for cross-axis testing of airbag crash sensors and for one, two or three axis screening applications.

12 Claims, 10 Drawing Sheets

VIBRATOR FOR SUBJECTING AN OBJECT TO VIBRATION

BACKGROUND OF THE INVENTION

The present invention relates to a vibration testing machine for subjecting an object to vibration of a prescribed amplitude and frequency. Although initially intended for cross axis testing of crash sensors, used as part of an automobile air bag restraint system, the machine has more general capabilities.

It is common practice to subject products that are being developed for the military, automotive or other markets, to vibration tests to determine the weak points in the product design. In some cases these vibration tests are meant to subject the product to a vibration stress that would be equivalent to what the device would experience during its useful life. If the product fails the test it must be redesigned until the tests are passed before the product is released for production.

It is now becoming increasingly common to vibration test production parts on a sampling basis to assure that they continue to pass the required specification. Some manufacturers are extending this process to where all production parts are subjected to a screening vibration test. In other cases, a sample off the production line is given a level of vibration which is intended to cause the product to fail.

It has been found that if all of the production parts are given a screening vibration test during the manufacturing process, that failures in the field are reduced along with the cost of returned product and warranty repairs. Failures that are found during this screening process also result in improvements in the production processes and, therefore, in higher quality products.

It has also been found in the vibration to failure tests, that a measure of the stability of the production process results. When the products fail in a shorter time period in these tests, the manufacturer knows that something has changed in the materials or production processes. A study of the failed parts points to where the change took place and thus leads to improvement in the process and to higher and more consistent quality parts.

Normally these vibration tests are conducted using standard voice coil vibrators such as manufactured by MB Dynamics, Ling Electronics, Ling Dynamic Systems, Unholz Dickie and others. These vibrators are usually large heavy machines requiring a significant installation space and are usually located in a testing laboratory. For vibrators to be used on a production line, on the other hand, it is desireable that they be small, light and powerful.

There are other situations where a small, light, but powerful vibrator is required. For example, a device was needed to subject an automotive crash sensor to cross axis vibrations while the sensor is simultaneously being shock tested along its longitudinal axis.

Components used on automobiles are subjected to various environmental tests to demonstrate performance under all automotive environments. A radio, for example, must function just as well on a hot day in Arizona as it does on a cold day in Alaska and the steering system must work when the car is traveling on a bumpy road as well as on a smooth one. In fact, every product on an automobile must be tested under each environment that it is likely to encounter during the normal lifetime of the vehicle. The one exception to this rule has been automobile crash sensors which are used with airbags.

During the precise moment that a crash sensor must perform its function and sense that an automobile is crashing, it is simultaneously being subjected to severe vibrations in all directions, yet never during the development and production of crash sensors are they subjected to these environments because, heretofore, no equipment has been available to conduct these tests. This is particularly significant since it is now well known that many crash sensor designs are significantly affected by vibrations that take place during crashes which can cause a significant delay in when the sensor triggers. Recent tests have shown that the vibration environment during a crash can even prevent some sensors from functioning. This resulting late deployment or non-deployment can cause serious injuries to vehicle occupants.

To solve this problem, a small, light, powerful vibrator could be mounted on the arm of a shock machine such as described in co-pending Castelli patent application Ser. No. 7/531,906 filed Jun. 1, 1990. Such a combination permits the simultaneous vibration and shock testing of a device such as a crash sensor.

The development of such a vibrator permits, in a similar manner, vibrators to be mounted onto other vibrators to give two and three axis vibration capability especially if the principles of rotary motion are used as disclosed herein.

There is a particular need for devices which will simultaneously vibrate a product in two or three axes for production screening as described above. If this screening requires the vibration of the product about three axes, it would cut the testing time down by at a factor of 3 if this can be done at the same time.

Conventional two or three axis vibrators connect each of the vibrators to the mounting plate through hydrostatic bearings thus isolating each axis from the motion of the other. These bearings make use of a pressurized fluid film between each vibrator and the mounting plate which requires provision for containing the fluid which is constantly leaking out of the hydrostatic bearing assemblies and a pump for creating the fluid pressure. This adds excessive weight and complexity and expense to the system.

SUMMARY OF THE INVENTION

A principal object of the present invention, therefore, is to provide an improved small, light weight and powerful vibrator to fulfill the needs described above.

Other particular objects of this invention include providing the following:
1) a cross axis vibrator for use in testing crash sensors;
2) a light weight dual axis vibrator;
3) a light weight three axis vibrator;
4) a multi-axis vibrator where the motions are transmitted through the use of rotary motion and simple hinge structures;
5) a light weight vibrator which permits the simultaneous vibration of two products in opposite directions.

DESCRIPTION OF THE PREFERRED EMBODIMENTS

Figure 1:
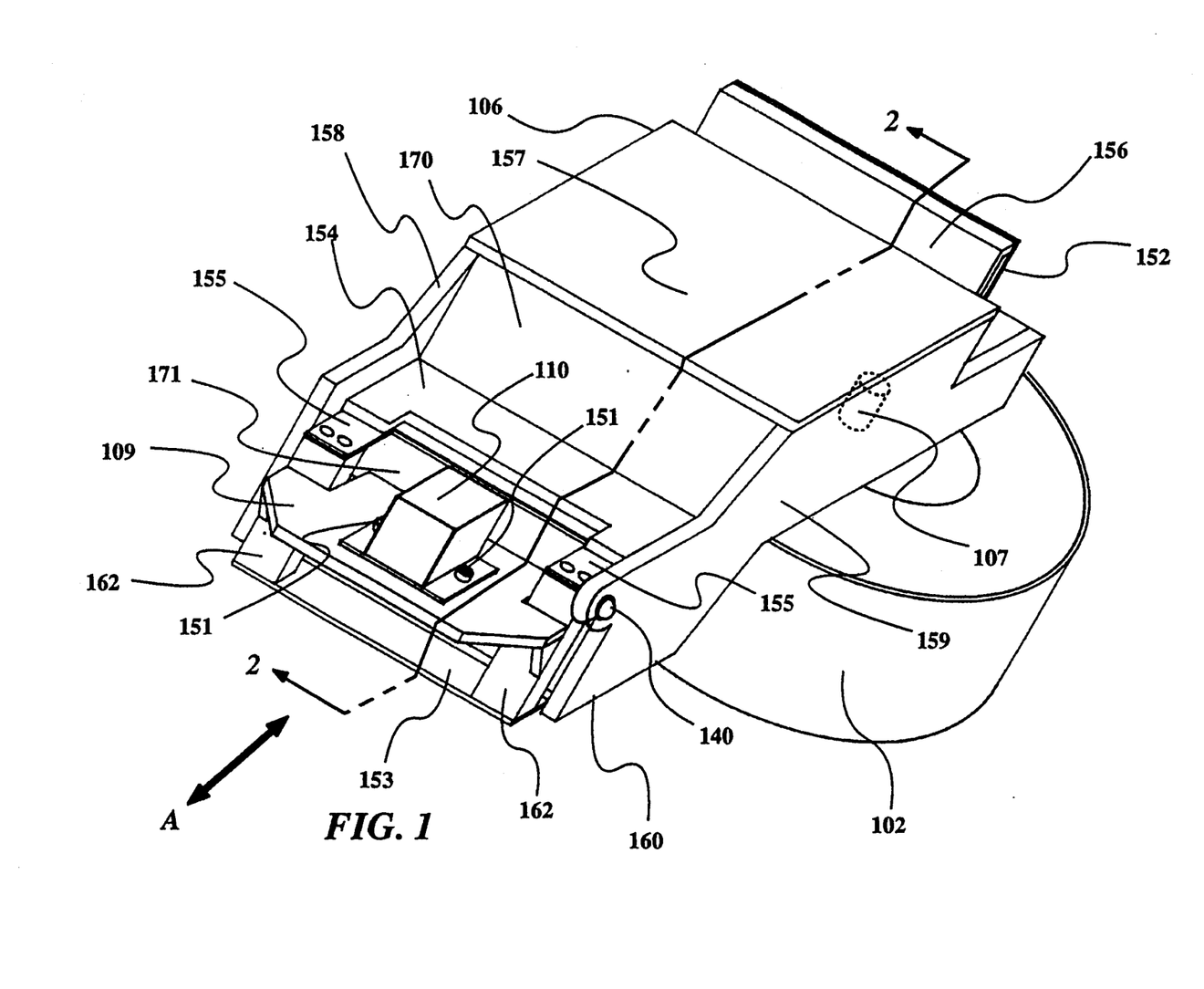
FIG. 1 is a perspective view of a preferred embodiment of a single axis cross axis vibrator for use on a rotary crash sensor tester.

A primary application for the vibrator of this invention is to permit the simultaneous vibration of a crash sensor along one axis while it is being shock tested along another orthogonal axis. This is accomplished in the preferred embodiment shown in FIG. 1 when used in conjunction with co-pending patent application Ser. No. 7/531,906 filed Jun. 1, 1990 to Castelli which is included herein by reference. The vibrator is shown generally at 106 mounted onto a servo motor 102 by means of shaft 107. The servo motor 102 and remainder of the crash sensor tester is shown in FIGS. 1, 5 and 6 of the above referenced patent application where the vibrator 106 of this invention replaces the swing arm 106 of the referenced patent application.

The sensor 110 to be tested is mounted on mounting plate 109 by any suitable means such as bolts 151. Mounting plate 109 is attached to supports 162 which are attached to flexible metal member 153. Flexible metal member 153 is attached to the vibrator housing 160. Because of the flexible nature of member 153, supports 162 and thus mounting plate 109 are permitted to rotate relative to housing 160. Supports 162 are also attached to flexible metal member 155 which is in turn attached to coil assembly 154. Other structural members include side supports 158 and 159 and top member 157 which is attached together by any suitable means.

Coil assembly 154 is suspended between magnet assemblies 170 and 171 by means of flexible members 155 and 152. Flexible member 152 is attached to housing member 156. When an alternating current flows through the coil in the coil assembly 154 as described in more detail below, coil assembly 154 vibrates back and forth causing supports 162 and mounting plate 109 to also vibrate back and forth as shown by arrow A. In this manner, the sensor to be tested is subjected to a vibration in an approximate radial direction from the shaft 107.

In a normal test sequence, the vibrator 106 begins rotating under the action of the servo motor 102 as explained in the above referenced patent application. At approximately the point where the impactor button 140, which is mounted on side structure 159, contacts the pulse spring, not shown, the alternating current begins flowing in the coil, and the mounting plate 109 begins to vibrate. Thus, at the precise time that the sensor is subjected to a test shock pulse in the longitudinal (circumferential) direction it is also subjected to a vibration in the radial (cross-axis) direction. By varying the magnitude and frequency of the cross axis vibrations and the magnitude and duration of the longitudinal pulse, the effects on the sensor time to trigger and dwell can be ascertained and the results plotted as described in more detail below.

Figure 2:
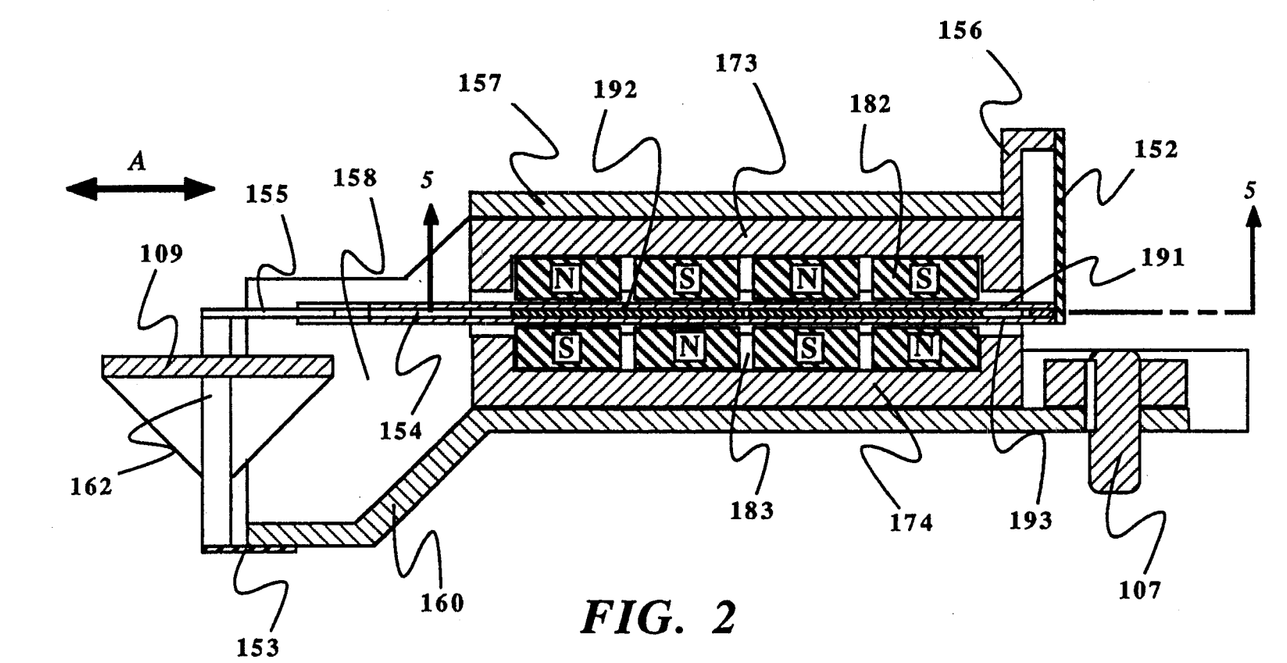
FIG. 2 is a cross-section view of the cross axis vibrator of FIG. 1 taken along line 2—2.

A cross section view of the vibrator, taken alone line 2—2 of FIG. 1, is shown in FIG. 2 where the same numbers refer to the same parts. 32 solid rectangular magnets 182 are used in this particular implementation. They are supported by iron members 173 and 174 and are separated by plastic spacers 183. The coil assembly consists of an upper plastic plate 191, a lower plastic plate 193 and the wire coils 192.

Figure 3:
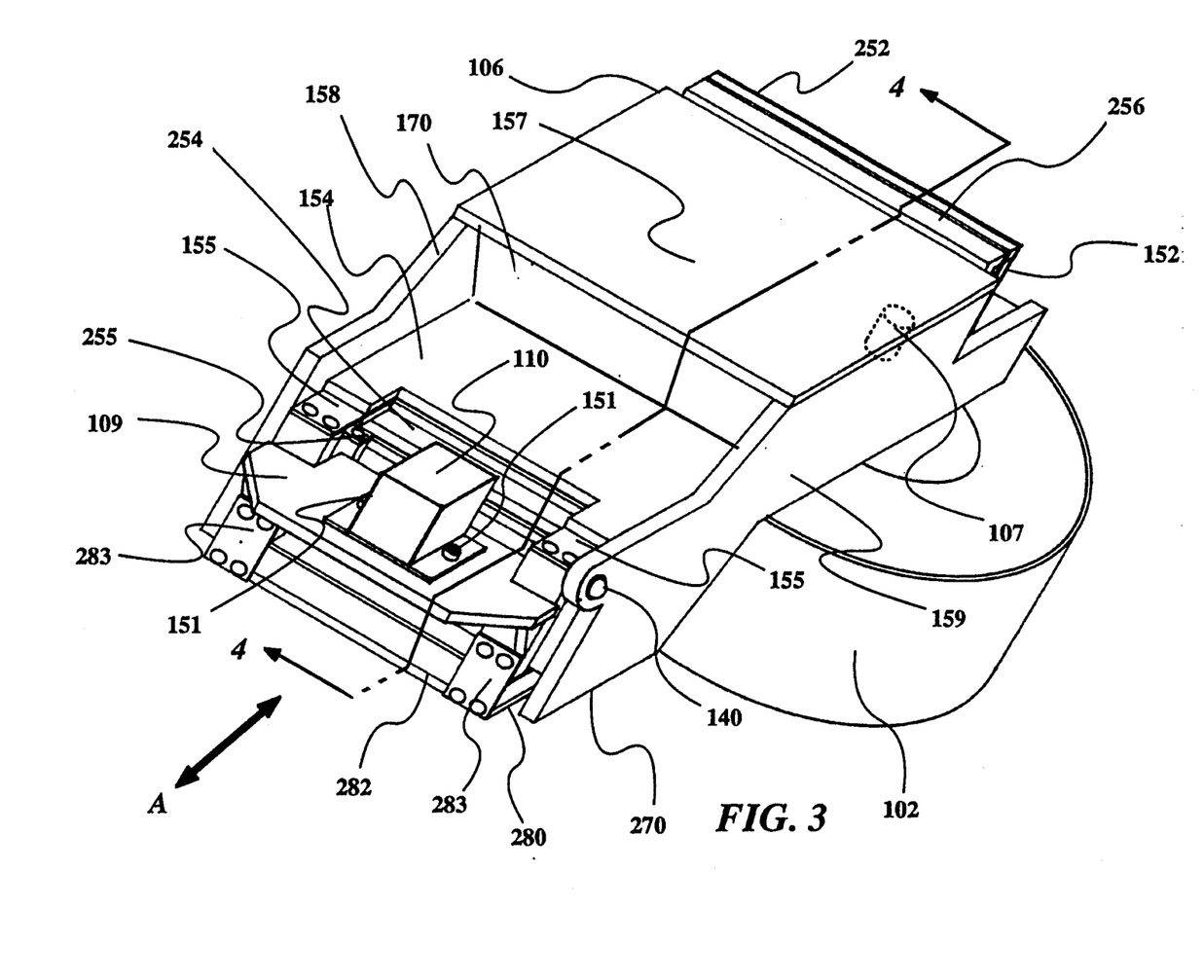
FIG. 3 is a perspective view of a preferred embodiment of a dual axis cross axis vibrator for use on a rotary crash sensor tester.
Figure 4:
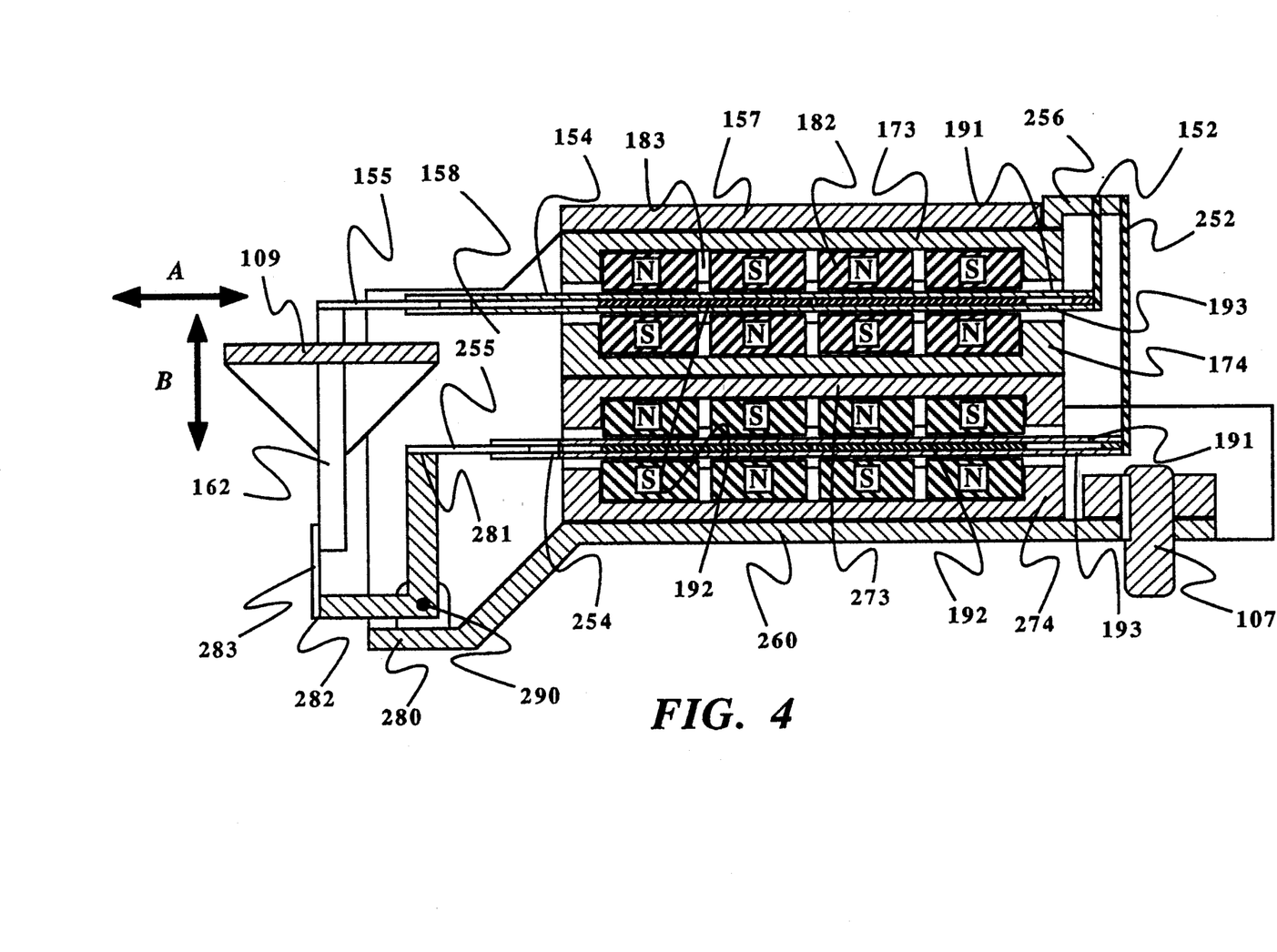
FIG. 4 is a cross-section view of the cross axis vibrator of FIG. 3.

It is sometimes desirable to simultaneously vibrate the sensor about two orthogonal axes while subjecting it to a shock pulse about a third axis. A device capable of accomplishing this is illustrated in FIGS. 3 and 4 where the same numbers represent the same parts as in FIGS. 1 and 2. In this case a second coil assembly 254 is attached the vibrator housing member 256 by means of flexible member 252, and to a pivoted linkage 280 by means of flexible member 255. Pivoted linkage 280 is attached to housing structure 260 by means of pivot rod 290. The coil assembly 254 vibrates and introduces a vibration to the end 281 of pivoted linkage 280 causing it to rotate about pivot rod 290. This rotation in turn causes end 282 of pivoted linkage 280 to vibrate in a nearly vertical direction imparting the same vertical vibration to the mounting plate 109. In this manner the sensor to be tested is, at the same time, subjected to both vertical and radial vibrations and the shock pulse in the longitudinal (circumferential) direction.

Most vibrators utilize a standard voice coil design consisting of a cylindrical coil and a radial magnetic field through which the coil travels. This is the most efficient design for the coil but leads to a heavy structure for the magnetic circuit. This is because the magnetic flux must be conducted from the inside of the coil around to the outside of the coil. The iron pole piece which is used to conduct the flux must be long enough to permit the total motion of the coil during its vibration cycle plus it must accommodate the length of the coil and its supporting structure. This flux path is usually quite long which requires a heavy iron structure. In the coil arrangement of the present invention, the magnetic circuit is quite short and is determined by the diameter of the flat coil. Pairs of gaps are used and the flux must be carried only between the gaps. In fact magnetic material can be used for most of this flux path requiring only a minimum of parasitic iron, resulting in the most efficient design.

Figure 5:
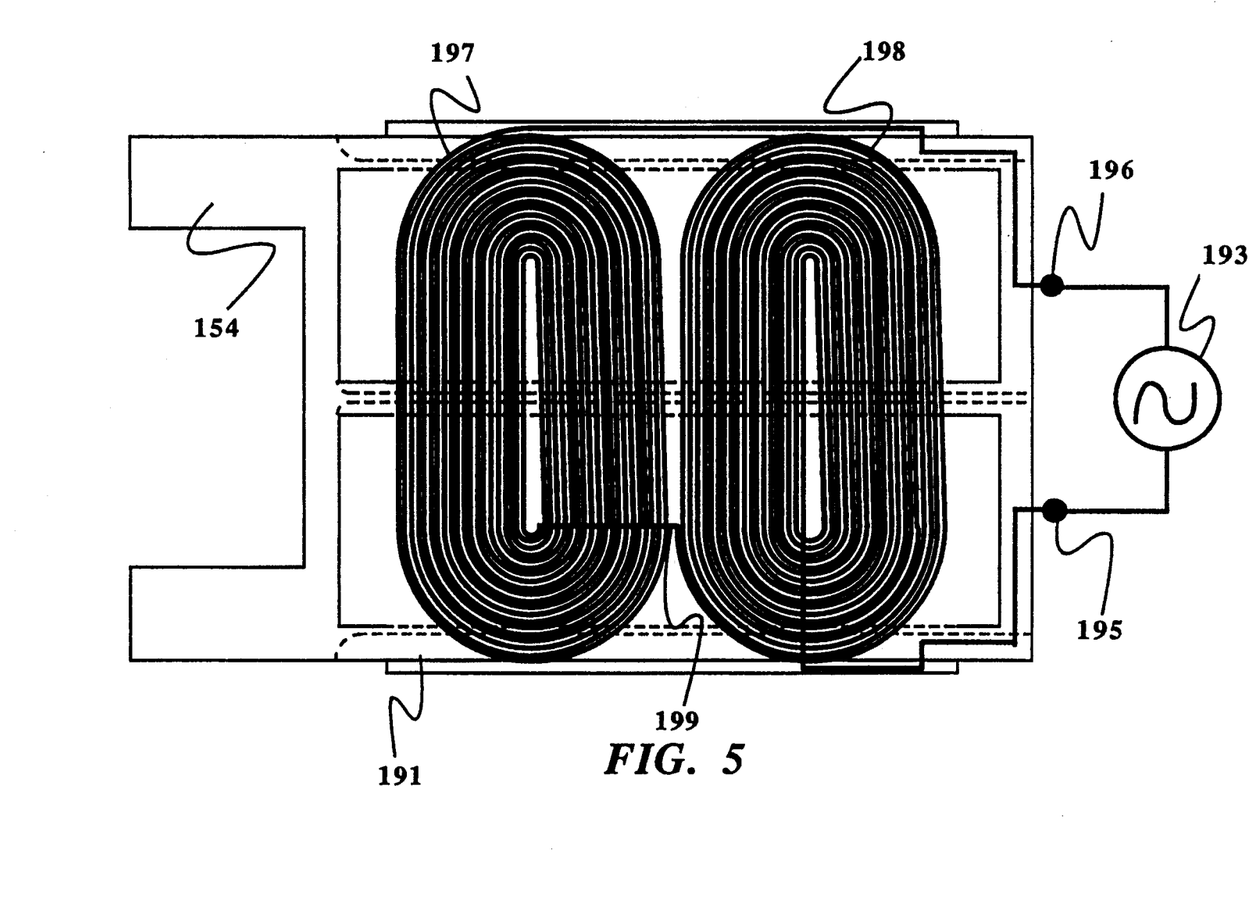
FIG. 5 is a top view of the coil assembly of FIG. 2 taken along line 5—5.

The magnetic circuit can be seen in FIG. 2 where the north and south magnetic poles are labeled on the figure. The electrical coil design is illustrated in FIG. 5. When assembled within the vibrator housing it lies in a plane perpendicular to the direction of flux in the gaps. A portion of the coil will necessarily lie outside of the gaps. By comparing FIGS. 2 and 5 it can be seen that when the current flows counterclockwise in the coils, so that it comes out of the page in FIG. 2 on the left side of each coil and into the page on the right, a force is produced portion of the coil which is located in the gaps due to the magnetic field in the same direction since the directions of the magnetic flux and the currents are both opposite in each gap.

In FIG. 5, two spirally wound coils 197 and 198 are shown connected by wire 199. Wires 195 and 196 lead from the coil assembly 154 and are connected to the source of electric power 193 which is shown schematically. The wire used for making the coils has an insulating coating to prevent the tightly wound coils from shorting. The wire also has a flat cross section and is rotated 90 degrees where it passes across the coils in order to minimize the coil thickness.

Figure 6:
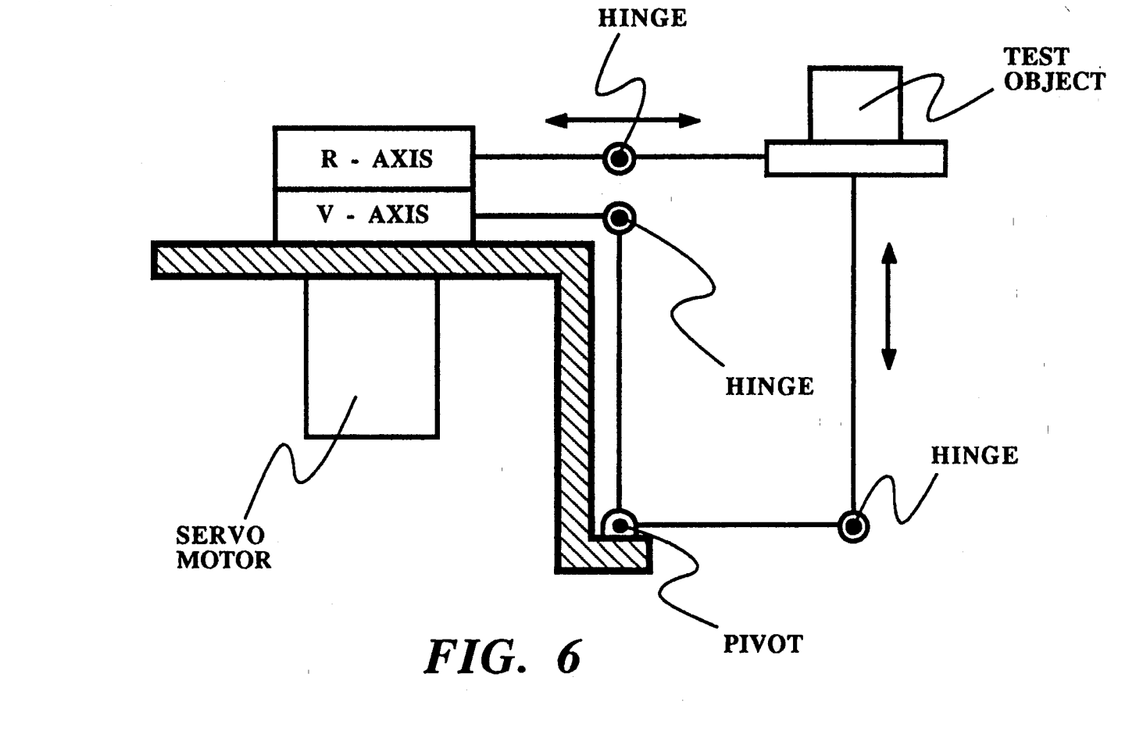
FIG. 6 is a schematic of the dual cross axis vibrator of FIG. 3.

FIG. 6 illustrates schematically the operation of the dual axis vibrator in conjunction with the servo motor of FIG. 4. The hinge functions are accomplished through the use of flexible metal strips, however, plastic hinges, pivoted structures door hinges or other structures could, of course, be used for some applications. Hinge, for the purpose of this invention, will be defined as a jointed or flexible device that allows the turning or pivoting of a part relative to another structure. In FIG. 6 the nomenclature "R-axis" and "V-axis" denotes the direction of vibration produced by each vibrator, R for radial and V for vertical.

Figure 7:
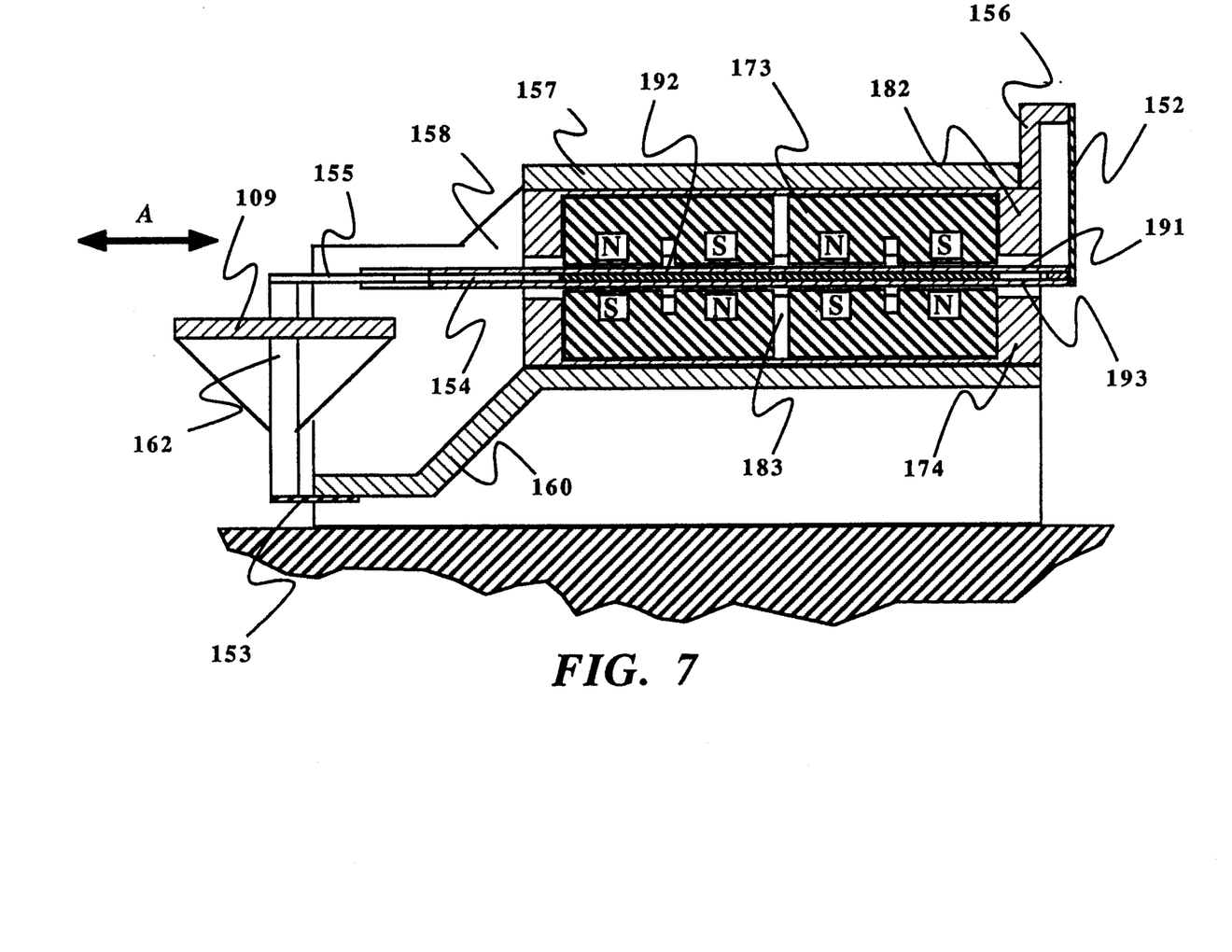
FIG. 7 is a cross section view of a one axis screening vibrator.

The flat coil vibrator design results in the minimum weight and size vibrator and thus lends it self to be used on production lines for either single or multi-axis vibrators. FIG. 7 illustrates a single axis design where like parts with the same numbers have the same function as in FIG. 1.

Figure 8:
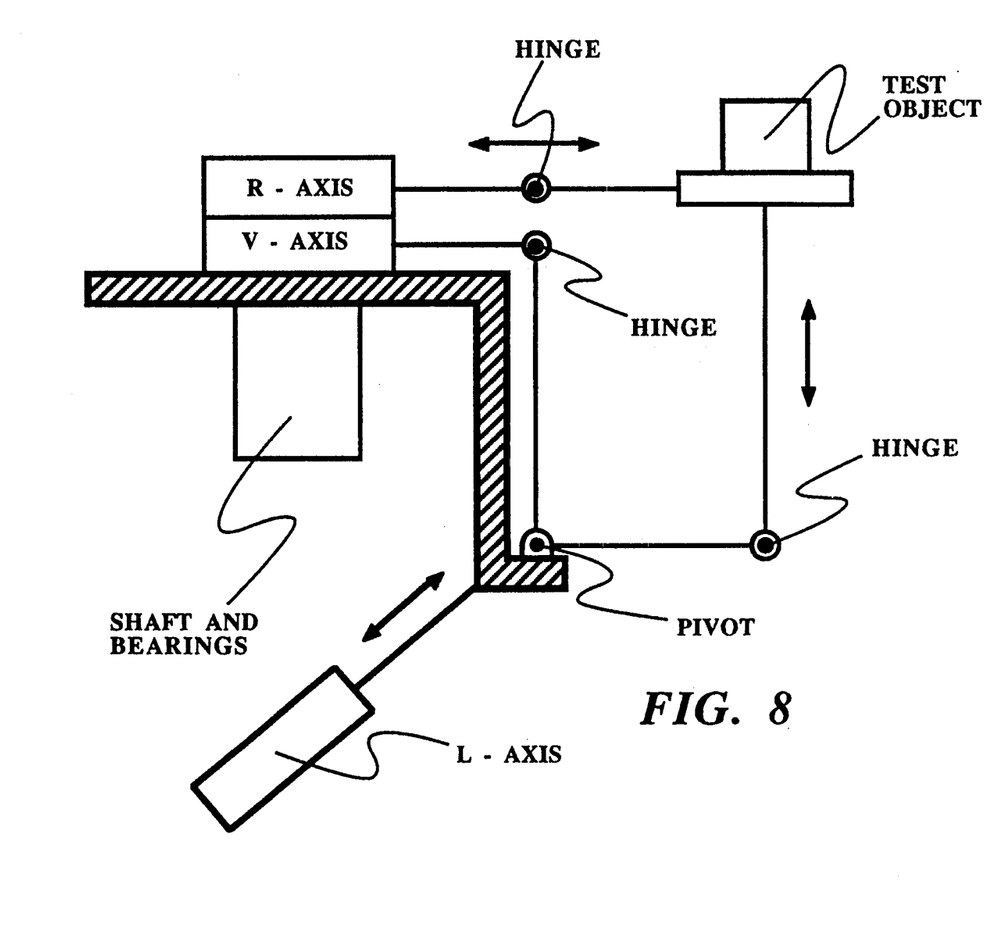
FIG. 8 is a schematic view of a three axis screening vibrator.

FIG. 8 is a schematic of a three axis vibrator similar to FIG. 6 with the servo motor replaced by a third vibrator. The nomenclature "L-axis" denotes that the vibrator so named creates vibrations along the longitudinal or circumferential axis.

Figure 9:
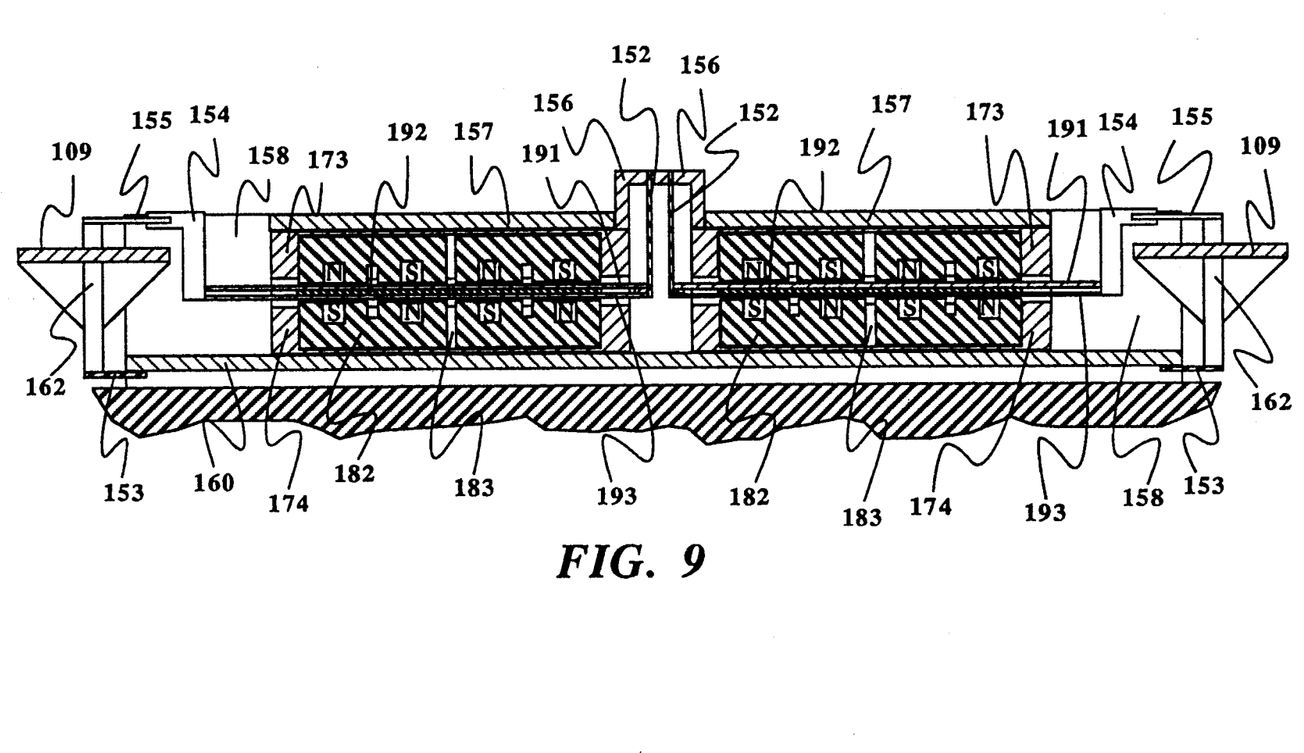
FIG. 9 is a cross section view of a bi-directional vibrator for vibrating two parts at the same time.

Since the vibrator weight is minimized in the vibrators built according to the teachings of this invention, there will be some motion of the magnet assembly unless the device is anchored to a heavy structure or the ground. This can be effectively eliminated if two such vibrators are placed back to back, as shown in FIG. 9, and activated with the same circuitry. In this manner the reaction of each vibrator is exactly countered by the other vibrator increasing the weight efficiency of the machine. This now permits two products to be vibrated in a smaller and lighter package than heretofore possible.

For cross axis vibration tests, the normal swing arm of the thruster illustrated in the above referenced patent application to Castelli, is replaced with a cross-axis vibration arm of the type shown in FIG. 1. In this configuration the sensor is mounted on a pivoted mounting plate which permits motion in the radial (lateral) direction. A flat coil vibrator is mounted on the arm close to the center of rotation. The vibrator construction consists of neodymium-iron-boron permanent magnets and flat coils. Naturally other magnetic materials could be used and, although permanent magnets are preferred for this invention, electromagnets could also be used. The vibration frequency and amplitude is determined by the computer and amplified to create the current to drive the vibrator. Using this construction, a sensor has been simultaneously vibrated at typically up to 50 G's in the lateral direction at frequencies from less than 100 to more than 1000 Hz, while it was simultaneously being subjected to a standard longitudinal haversine shaped shock pulse.

Figure 10:
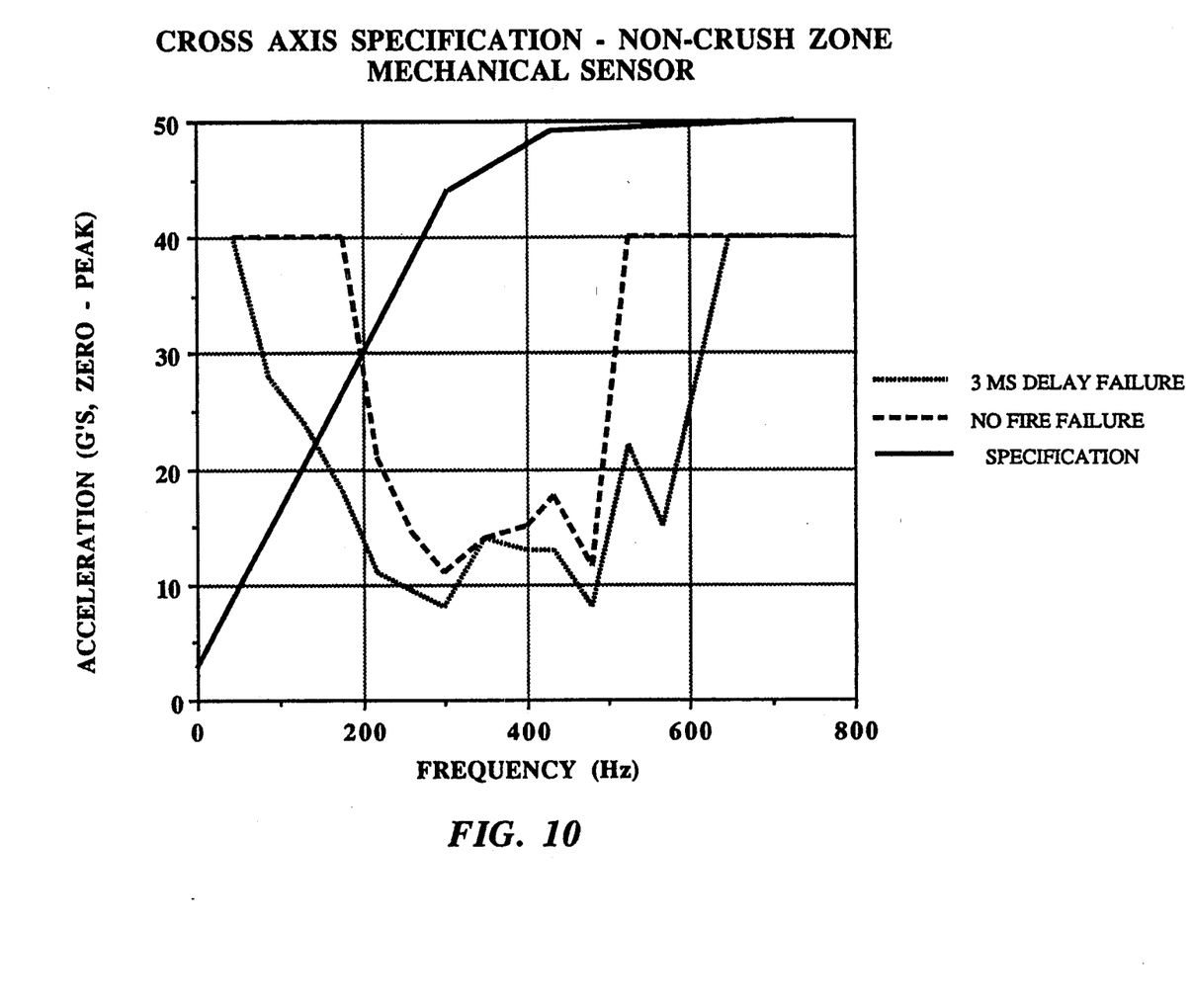
FIG. 10 is a plot of the cross axis sensitivity of a common air bag crash sensor.

An example of the results of a cross axis test, on a conventional mechanical ball-in-tube passenger compartment mounted airbag sensor, is shown in FIG. 10. A large number of crash pulses were first studied to determine the level of cross axis vibrations that are typically present in 10 to 14 MPH automobile crash pulses. A specification was then determined as a magnitude versus frequency plot representing the level of vibrations which should not have a deleterious effect on the crash sensor. This is shown on FIG. 10 as the line marked specification. In order to pass this specification, a sensor should not be affected when subjected to any combination of cross axis vibrations having a frequency and magnitude below the line on FIG. 10.

The sensor to be studied was placed on the cross axis tester and the magnitude versus frequency plot was determined where the sensor ceased to trigger at all and when there was a triggering delay of 3 milliseconds. These lines are also plotted and labeled on FIG. 10. As can be seen from the plot, the sensor performed satisfactorily for frequencies below about 130 Hz but failed at all higher frequencies. It would be expected, therefore, that this sensor will trigger late or not at all on some 10–14 MPH or even higher velocity crashes where the airbag is required and, as a result, vehicle occupants will be injured.

This cross-axis failure of the ball-in-tube sensor was not known during its development since neither the study to determine the specification nor the testing equipment to characterize the sensor under cross-axis vibrations were available. The cross-axis vibrator of this invention, therefore, for the first time permits this very important characterization to be performed which will lead to better crash sensors having fewer design defects and thus to fewer injuries.

In the experimental results of FIG. 10, the sensor was subjected to one frequency of cross-axis vibration at a time. The vibration was begun at the point of contact between the swing arm and the pulse spring, that is, simultaneously with the longitudinal pulse. The tests so far have been conducted at a single frequency at a time. The cross-axis vibration frequency and magnitude is created by a computer and, therefore, need not be limited to a single frequency. Random vibrations having a spectral density function similar to real crashes could be applied to the sensor using the cross axis vibrator. Also, data recorded from a real crash can be used to vibrate the sensor to eliminate any of the assumptions associated with characterizing cross-axis vibrations using a single or combination of frequencies.

A key feature of this invention is the use of hinge structures for coupling the vibrators to the mounting table onto which the test specimen is attached. These hinges are preferably made form a sheet of flexible metal, however, many other hinge type structures would also work as previously discussed. The preferred flat sheet structure permits large forces to be transmitted alone the direction of vibration while providing relatively little resistance to motion in a direction perpendicular to the sheet. Similarly, the hinge also resists large forces in the plane of the hinge but perpendicular to the vibration direction. Although the test specimen is subjected to some amount of rotational motion due to this hinge structure, this is of little consequence for most applications. The amount of the rotational motion can be controlled through increasing the distance of the test specimen from the axis of rotation of the hinge.

The use of hinge structures greatly simplifies the construction of two and three axis vibrators. In conventional designs, complicated hydrostatic bearing structures are employed to permit force to be applied to the mounting table from more than one direction. These structures add considerable cost, complexity and weight to the machines.

The hinge structure also permits the construction of a lateral vibrator without the requirements of a slip table. In conventional vibrators, the test specimen is generally tested in a vertical direction. When lateral vibrations are required, the weight of the mounting table and specimen must be supported. This is generally done using a slip table which is typically a flat table on which the mounting table rests usually through the use of hydrostatic bearings. If the hinge structure is replaced by a single pivot, two orthogonally placed vibrators can be made to act on the test specimen mounting table permitting a dual axis vibration machine again without the use of a slip table.

Many other advantages result from the use of rotary motion. Second and third axes vibrators can be pivotally mounted onto the first vibrator, for example. In this manner the coupling between the different vibration directions is easily achieved.

There has thus been shown and described an improved vibration testing machine which fulfills all the objects and advantages sought therefor. Many changes, modifications, variations and other uses and applications of the subject invention will, however, become apparent to those skilled in the art after considering this specification and accompanying drawings which disclose the preferred embodiments thereof. All such changes, modifications, variations and other uses and applications which do not depart from the spirit and scope of the invention are intended to be covered by the invention which is limited only by the following claims.

We claim:

1. A vibrator for subjecting an object to vibration comprising:
   a) a housing containing at least one magnet;
   b) means within said housing to conduct magnetic flux from said magnet to form a magnetic circuit containing at least two air gaps through which magnetic flux passes;
   c) a substantially planar, spirally wound, electrically conducting coil;
   d) electric power means to cause an electric current to flow in said planar coil;
   e) means to support said coil and to position a portion of said planar coil within and perpendicular to said air gaps wherein the interactions of said electric current and said magnetic flux in said gaps produce forces on said coil;
   f) mounting structure adapted to support the object to be vibrated; and
   g) means to attach said mounting structure to said coil, said attachment means causing said mounting structure to move in response to said force on said coil.

2. The invention in accordance with claim 1, wherein said at least one magnet is a permanent magnet.

3. The invention in accordance with claim 1 wherein said coil support and position means comprises a flexible metal hinge.

4. The invention in accordance with claim 1 wherein said mounting structure attachment means comprises a flexible metal hinge.

5. The invention in accordance with claim 1 further comprising means to attach said vibrator to a shock testing machine.

6. A vibrator for subjecting an object to vibration comprising:
   a) a housing containing at least two magnets;
   b) at least two air gaps between said magnets through which magnetic flux passes;
   c) a substantially planar, spirally wound, electrically conducting coil;
   d) electric power means to cause an electric current to flow in said planar coil;
   e) means to support said coil and to position a portion of said coil within and perpendicular to said air gaps wherein the interactions of said electric current and said magnetic flux in said gaps produce forces on said coil;
   f) mounting structure adapted to support the object to be vibrated; and
   g) means to attach said mounting structure to said coil, said attachment means causing said mounting structure to move in response to said force on said coil.

7. The invention in accordance with claim 6 wherein said magnets are permanent magnets.

8. The invention in accordance with claim 6 wherein said coil support and position means comprises a flexible metal hinge.

9. The invention in accordance with claim 6 wherein said mounting structure attachment means comprises a flexible metal hinge.

10. A vibrator for subjecting an object to vibration comprising:
    a) a housing containing at least one magnet;
    b) means within said housing to conduct magnetic flux from said magnet to form a magnetic circuit containing at least one air gap through which magnetic flux passes;
    c) an electrically conducting coil within said housing;
    d) electric power means to cause an electric current to flow in said coil;
    e) means to support said coil and to position a portion of said coil within and perpendicular to said air gap wherein the interaction of said electric current and said magnetic flux in said gap produces a force on said coil;
    f) a mounting structure adapted to support the object to be vibrated; and
    g) hinge means to attach said mounting structure to said housing and to said coil, said hinge means causing motion of said mounting structure relative to said housing in response to said force on said coil.

11. The invention in accordance with claim 10 where said hinge means comprises a flexible metal member.

12. The invention in accordance with claim 10 further comprising means to attach said vibrator to a shock testing machine.

* * * * *